Aug. 20, 1968  A. PHILLIPSON ET AL  3,397,425
EMBOSSING PRESS FOR GRAMOPHONE RECORDS
Filed Sept. 11, 1964
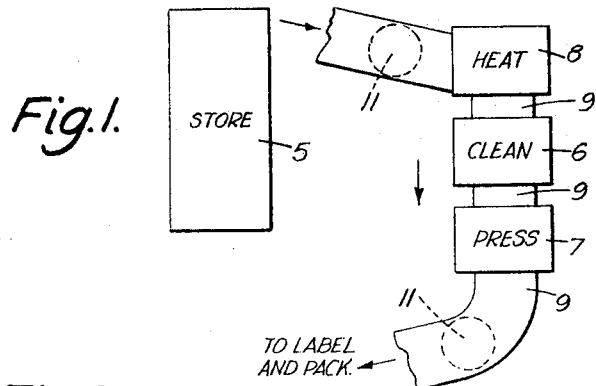
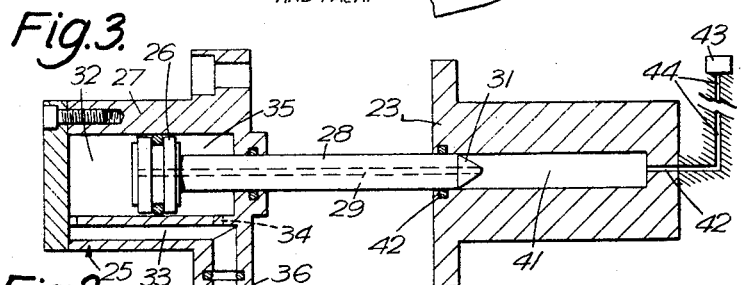
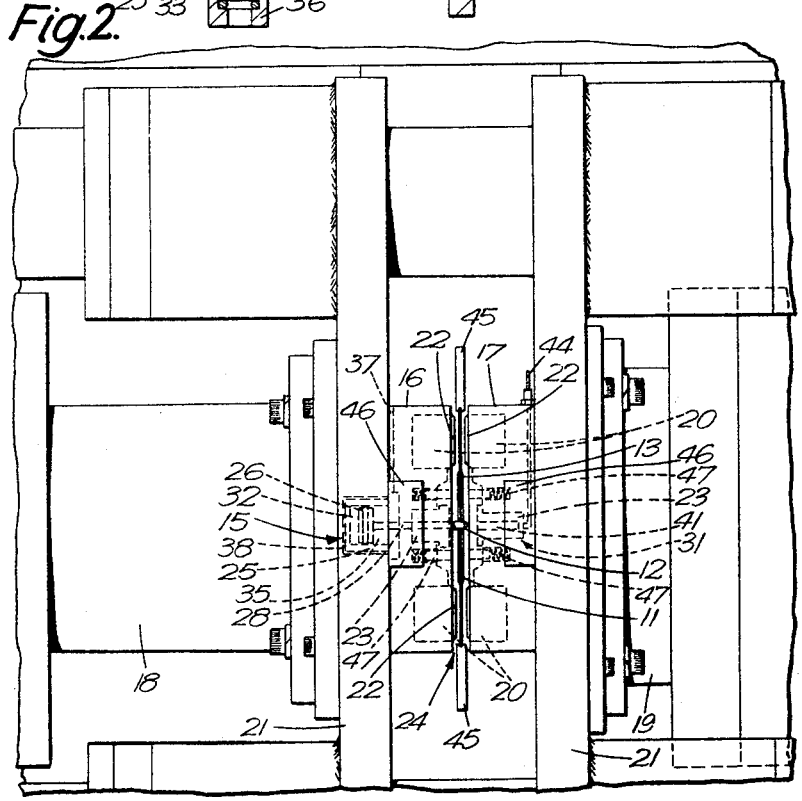

United States Patent Office
3,397,425
Patented Aug. 20, 1968

3,397,425
EMBOSSING PRESS FOR GRAMOPHONE RECORDS
Alan Phillipson, Basil Harry Royston Spiller, Robin Smith, and Harry Cheesman, London, England, assignors to Decca Limited, London, England, a British company
Filed Sept. 11, 1964, Ser. No. 395,873
Claims priority, application Great Britain, Sept. 16, 1963, 36,328/63
16 Claims. (Cl. 18—5.3)

ABSTRACT OF THE DISCLOSURE

An embossing press for embossing sound tracks on blank preformed discs. Each disc, after cleaning, is fed between a pair of opposed die plates. A photoelectric sensing arrangement responds to the feeding of the disc between the die to operate a double acting piston and cylinder assembly which moves a sensing pin axially through the central hole in the disc. The pin supports the disc during the embossing. The pin is also hollow, and air is passed through it so that a pneumatically operated switch which controls the moving together of the die plates is only actuated by the air pressure from the pin when the passage of the pin through the central hole is completed and the disc is held by the pin in a properly centered position for embossing.

---

This invention relates to the manufacture of gramophone record by a process in which sound tracks are embossed in a preformed blank disc, that is a disc of the requisite size and shape but having no sound track formed upon it.

Heretofore the usual way to make gramophone records has been by pressing a moulding material, in the form of powder, granules or a biscuit, between heated die plates which mould the material to the required final shape with sound tracks on the two faces. The die plates are then cooled so that the record can then be removed from the press. The heating and cooling of the die plates for each record necessarily takes some time. It has been proposed to produce records automatically by embossing sound tracks on a blank strip of suitable material and stamping out the required disc from the strip. Such a technique leads to the possibility of much more rapid production of records but it cannot be used for the production of the usual types of disc records where the disc has to be thicker at the centre than nearer the outside edges. The standard shapes of gramophone records discs are set out in British Standard Specification 1928 and in the International Electrical Technical Commission Publication 98/64. The centre region is formed thicker than the outer region on which the sound track is formed so that in a stack of discs rotary drive can be transmitted by friction between the central regions of adjacent discs (often aided by small castellations on the central region) while the sound track of adjacent discs are held apart so that dust particles trapped between them may not be pressed into the tracks.

A much more rapid process for the production of gramophone records consists in forming blank discs by injection moulding and subsequently embossing sound tracks thereon. The time taken to emboss sound tracks is relatively short compared to the time taken to form the disc which carries the sound tracks; thus, it is possible to preform blank discs and to store them until required. It is possible then to keep a steady flow of production of blank discs and yet be able to meet sudden demands, which in the gramophone record industry are commonly seasonal, by using a high speed automatic embossing press.

The art therefore demands a high speed embossing press. There are certain problems associated with the design of such a press. In order to provide rapid embossing, the die plates used should have a maximum separation which is relatively small, for example a few centimetres. This necessitates the feeding in of the record in its own plane. Also, however, the disc must be correctly centered with respect to the die plates before embossing takes place. Finally, the operation of the die plates in the absence of a correctly centered disc may well cause serious damage to the press.

Hitherto, no satisfactory solution to these problems has been found. A number of prior examples of gramophone materials are employed as the layeer 14. Alternatively, record making apparatus can be found in the prior art, but generally speaking they suffer from at least one of three main disadvantages, namely: (i) the formation of the disc's shape at least partly takes place at or near the same time and place as embossing, which effectively lengthens the embossing cycle; and (ii) the discs cannot conveniently be fed rapidly between the die plates or (iii) they cannot conveniently be used to emboss blank discs.

It is therefore the general object of the present invention to provide an improved embossing press for gramophone records.

Briefly, the present invention resides in an embossing press in which each blank disc to be embossed is fed between the die plates of the press and in which a centering pin is then moved so as to pass through the central hole in the disc; sensing means are provided to inhibit the closure of the die plates until the passage of the centering pin is complete. Thus, the pin serves not only to ensure that the disc is properly centered but prevents any damage due to die closure with absence of disc or mispositioning of a disc. Since the pin is not moved forward until the disc is generally between the die plates the die plates need have only a small maximum separation. The operations effected by the pin are in essence quite simple and lend themselves readily to rapid, safe and automatic operation of the press. The use of the centering pin in the manner described in conjunction with the embossing of completely preformed, blank discs provides a radical improvement in the performance of an embossing press and consequently in the technique of gramophone disc record manufacture generally.

An example of the invention will now be described with reference to the accompanying drawings, in which:

FIGURE 1 is a block diagram of gramophone record making apparatus;

FIG. 2 is a plan view of part of the embossing press of FIGURE 1; and

FIGURE 3 is a section through the locating device of the press of FIGURE 2 showing the engagement of its two components.

Referring to the drawings a disc 11 is preformed, for example by injection moulding with a central hole 12, an inner annulus 13 around the hole and an outer annulus 14 around the inner annulus on which outer annulus the sound track is to be embossed. The inner annulus 13 is thicker than the outer annulus so that when records are stacked the sound tracks of adjacent records are not in contact.

When a performed disc is to be embossed, it is removed from store 5 (see FIGURE 1) and cleaned at a cleaning station 6 so that no contamination is pressed into the disc 11 by the dies of the embossing press 7. The cleaning operation is described in co-pending United States patent application No. 383,839 filed July 20, 1964. The embossing dies are heated, and in order to prevent distortion of the disc as might occur when the outer annulus is heated in the dies while the inner annulus remains cool, the inner annulus is preheated at a heating station 8 immediately before cleaning. The pre-heating operation is described in co-pending United States patent application Serial No. 395,872 filed September 11, 1964.

After embossing, the record disc is labelled and packed. The labelling operation is described in co-pending United States patent application Serial No. 395,874 filed September 11, 1964. Conveniently the disc passes from one operation to another by rolling or sliding down chutes 9.

At the embossing station 7 the cleaned preformed disc 11 with its central region 13 pre-heated is located in a vertical plane on a locating device 15 between two embossing die plate assemblies 16, 17 which are then urged together to emboss sound tracks on the outer annulus 14 of the disc.

The die plate assemblies 16, 17 have electric heating coils 20 with thermostatic controls to maintain the correct temperature and annular die plates 22 opposite the outer annulus 14 of the disc secured to the assemblies by central hollow bushes 23. The assemblies 16, 17 are mounted on the plates 21 moved by the pistons 18, 19 of hydraulic rams. One piston 18 is normally held stationary while the other 19 moves over a short stroke to open and close a narrow slot 24 between the die plates 16, 17. The apparatus receives the disc 11 when the piston 19 is retracted and embosses the disc between the plates when the piston 19 is extended. The first piston 18 can be retracted over a comparatively long stroke to provide access to the die plates and locating device 15.

The locating device 15 has a component mounted in the centre of each die plate assembly. On the first piston 18 the locating device component is a double acting air operated piston and cylinder unit 25. The piston 26 of the unit 25 extends forwards from its cylinder 27 through the bush 23 in the form of a hollow pin 28 having an axial bleed passage 29 extending from the front end 31 of the pin 28 to the chamber 32 in the cylinder 27 to which air is applied to extend the piston 26. The front end 31 of the pin 28 is tapered. The air supply tubes 33, 34 to the two chambers 32, 35 of the unit 25 pass beside each other through the body of the unit to the rim 36 which overlies the plate 21 and connect with air passages 37 formed in the rear of the assembly 16. The face of the first ram plate 21 is recessed at 38 to receive the rear of the unit 25.

On the second piston 19 and bush 23 acts as the locating device component. The bore 41 of this bush 23 is adapted to receive the pin 28 of the piston 26. The bore 41 has an O-ring seal 42 at its mouth which seals against the pin 28 of the piston 26 when the front tapered portion 31 has passed into the bore 41. A remote air operated electrical switch 43 is connected to the bore 41 through an air passage 44 at the rear end of the bore.

The disc 11 falls from the central region heating station (not shown) with its rim between two grooved nylon guides 9. The guides 9 terminate in two movable catch arms 45 at the level of the die plates 16, 17, which arms 45 hold the disc 11 in its approximate position for embossing. Lamp and photocell devices 46 are located above and below the assemblies 16, 17 to detect the removal of an embossed disc and the arrival of a blank disc passing to this embossing position and causes dry clean air to be supplied to the piston and cylinder unit 25 so that the piston 26 extends through the spindle hole 12 of the disc. As the tapered front portion 31 of the piston pin 28 passes through the hole 12 the disc 11 is moved to its exact position for embossing, that is with its central hole 12 concentric with the die assemblies 16, 17. When the tapered front portion 31 has passed through the disc 11 and into the bore 41 the O-ring 42 seals against the pin 28 and the air from the extending chamber 32 of the unit 25 escaping up the bleed passage 29 is trapped in the bore 41. The air pressure in the bore 41 increases and operates the switch 43. The remote switch operates and causes the catch arms 45 to withdraw from between the die plate assemblies 16, 17. When the arms 45 have withdrawn they operate a further switch which causes the second ram 22 to extend, urging the die plates together to emboss sound tracks on the disc. If the switch 42 is not operated, for example if the disc is misplaced so that the pin 28 may not pass through the spindle hole 12, the withdrawal of the catch arms 45 and urging together of the die plates is inhibited.

After the plates are urged together the piston 26 of the locating device 25 is withdrawn automatically and after the embossing is complete the second piston 19 is withdrawn. The embossed disc is prised off the die plates 22 by spring loaded ejector pins 47 acting on the inner annulus 13 of the disc and the disc falls down the chute 9 to pass to the labelling apparatus.

We claim:
1. Gramophone record making apparatus for the production of a gramophone record from a blank preformed disc, that is to say a disc of the required size and shape but having no sound track formed upon it, comprising die plates operable to emboss tracks on the disc; feeding means for feeding a blank disc between the die plates; centering means operable to hold the disc central with respect to the die plates when the die plates are urged together to emboss the sound tracks, said centering means comprising a pin mounted to move with respect to one of the die plates and means operable to move the pin forward through the central hole in the disc after the disc has been fed between the plates but before the die plates are urged together; and sensing means, mounted to move with the other of the die plates to sense the passage of the pin through the central hole, operative to inhibit the closing of the die plates if the pin has not passed through the central hole in the disc.

2. Gramophone record making apparatus for the production of a gramophone record by embossing sound tracks on a blank preformed disc of the required size and shape and having a central hole, comprising:
a pair of opposed die plates operable when urged together to emboss sound tracks on a blank disc located between them;
urging means operable to urge said die plates together;
feeding means for feeding a blank disc to a position at least approximately centered with respect to said die plates;
a pin mounted to move axially with respect to and from within one of the die plates to pass through said central hole if said disc is correctly centered with respect to said die plates;
double acting moving means for moving said pin forward through said central hole in response to a first control signal and for retracting said pin therefrom;
first sensing means for sensing the passage of said disc to said position and for producing said first control signal in response thereto;
control means for operating said urging means in response to a second control signal; and
second sensing means for sensing the passage of said pin through said central hole and for producing said second control signal in response thereto, said pin supporting said disc in position for embossing when said passage is completed.

3. Apparatus as claimed in claim 1 wherein the means operable to move the pin forwards comprises a double acting air-operated piston and cylinder unit and wherein control means is provided for automatically moving the pin forward before the die plates are urged together and for retracting it after the plates are urged together.

4. Apparatus as claimed in claim 1 wherein the pin and the sensing means are mounted on their respective die plates.

5. Apparatus as claimed in claim 1 wherein the pin is directly mounted on an air-operated piston coaxially therewith and a bleed passage is provided through the piston along the length of the pin, the sensing means being responsive to the air from said bleed passage.

6. Apparatus as claimed in claim 5 wherein the sensing means comprises a cylindrical recess arranged to receive the pin having passed through the hole in the disc and a pressure responsive device operated by the increase of pressure in the recess due to the air from said bleed passage when the pin enters the recess.

7. Apparatus as claimed in claim 6 wherein a seal is provided around the mouth of the recess to seal against the pin when the pin enters the recess.

8. Apparatus as claimed in claim 7 wherein the pressure responsive device is arranged to operate an electrical switch which inhibits urging together of the die plates unless the device is operated by an increase in air pressure in the recess.

9. Apparatus as claimed in claim 1 wherein the die plates are provided with electrical heaters.

10. Apparatus as claimed in claim 9 wherein the die plates are provided with thermostats connected to the electrical heaters for ensuring that the die plates are maintained at the required temperature.

11. Apparatus as claimed in claim 1 wherein the die plates are arranged to apply pressure to the faces of the disc only over the regions where the sound tracks are to be embossed.

12. Apparatus as claimed in claim 1 wherein the apparatus is arranged so that the disc lies in a vertical plane when being embossed, the feeding means comprising a chute and two movable catch arms for holding the disc dropping from the chute in position between the die plates until the pin enters the central hole, the catch arms then being withdrawn automatically before the die plates are urged together.

13. Apparatus as claimed in claim 1 comprising spring-loaded ejector pins for ejecting the disc from the die plates when the die plates are drawn apart after the disc has been embossed.

14. Apparatus as claimed in claim 1 comprising sensing means adjacent the feeding means for sensing the passage of a disc to the die plates and for inhibiting the operation of the die plates when no disc is present between the die plates.

15. Apparatus as claimed in claim 14 comprising cleaning means for cleaning the blank disc, said feeding means being operable to traverse said disc from said cleaning means into position between said die plates.

16. Apparatus as claimed in claim 15 wherein the cleaning means comprises means for supporting the disc for rotation substantially about its axis and means for directing jets of gas on to the disc to cause the disc to rotate so that dust particles are removed by the combined effect of centrifugal force and the gas jets.

References Cited

UNITED STATES PATENTS

| | | | |
|---|---|---|---|
| 1,308,475 | 7/1919 | Burroughs | 18—5.3 |
| 1,393,916 | 10/1921 | Smith. | |
| 2,615,197 | 10/1952 | Somers | 18—5.3 XR |
| 2,642,621 | 6/1953 | Arno | 18—5.3 XR |
| 2,663,050 | 12/1953 | Helm | 18—5.3 XR |
| 2,992,455 | 7/1961 | Zalzman | 18—5.3 |
| 3,112,523 | 12/1963 | Goulet et al. | 18—5.3 |
| 3,113,905 | 12/1963 | Rosen | 18—5.3 |
| 3,222,724 | 12/1965 | Soderquist | 18—17 |

FOREIGN PATENTS

| | | |
|---|---|---|
| 86,267 | 1/1955 | Denmark. |
| 312,723 | 6/1929 | Great Britain. |
| 901,814 | 7/1962 | Great Britain. |

J. HOWARD FLINT, JR., *Primary Examiner.*